(12) United States Patent
Kishi et al.

(10) Patent No.: US 7,432,013 B2
(45) Date of Patent: Oct. 7, 2008

(54) SECONDARY BATTERY AND METHOD OF GENERATING ELECTRIC POWER

(75) Inventors: Kentarou Kishi, Ashigarakami-gun (JP); Kei Shimotani, Ashigarakami-gun (JP); Tomoko Miyahara, Ashigarakami-gun (JP); Shinji Hasegawa, Ashigarakami-gun (JP); Yoshio Nishihara, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 415 days.

(21) Appl. No.: 10/986,866

(22) Filed: Nov. 15, 2004

(65) Prior Publication Data

US 2005/0260460 A1 Nov. 24, 2005

(30) Foreign Application Priority Data

May 18, 2004 (JP) .............................. 2004-147248

(51) Int. Cl.
*H01M 4/36* (2006.01)
*H01M 4/48* (2006.01)
*H01M 6/20* (2006.01)

(52) U.S. Cl. ..................... 429/105; 429/188; 429/210

(58) Field of Classification Search ................ 429/105, 429/188, 207, 210
See application file for complete search history.

(56) References Cited

U.S. PATENT DOCUMENTS

| 4,783,381 A | 11/1988 | Tytgat et al. |
| 5,804,329 A * | 9/1998 | Amendola ..................... 429/34 |
| RE37,433 E * | 11/2001 | Zimmerman et al. ........ 205/620 |
| 2003/0019758 A1 | 1/2003 | Gopal |

FOREIGN PATENT DOCUMENTS

| EP | 0 592 988 A1 | 4/1994 |
| JP | 07-099707 A | 4/1995 |

* cited by examiner

*Primary Examiner*—Patrick Ryan
*Assistant Examiner*—Ben Lewis
(74) *Attorney, Agent, or Firm*—Oliff & Berridge, PLC

(57) ABSTRACT

A secondary battery comprising a power generating part and a charging part, wherein
the power generating part comprises an acidic medium in which a first electrode is disposed and a basic medium in which a second electrode is disposed;
the acidic medium and the basic medium are disposed adjacent to each other;
at least one of the acidic medium or the basic medium includes at least one reactive substance; and
the charging part comprises a reactive substance regenerating device which regenerates the reactive substance from power-generation products produced by electric power generation in the power generating part.

14 Claims, 7 Drawing Sheets

SECONDARY BATTERY AND METHOD OF GENERATING ELECTRIC POWER

CROSS-REFERENCE TO RELATED APPLICATION

This application claims priority under 35 USC 119 from Japanese patent Application No. 2004-147248, the disclosure of which is incorporated by reference herein.

BACKGROUND OF THE INVENTION

1. Field of the Invention

The present invention relates to a secondary battery and a method of generating electric power.

2. Description of the Related Art

A battery is a device that converts chemical energy of a substance into electric energy. Also, batteries can be classified into primary batteries that provide electric power until their chemical energy is exhausted, secondary batteries that can be reused by being charged after exhaustion of their chemical energy so that the chemical energy is restored, and fuel cells that provide electric energy while continuously supplied with a substance having chemical energy from outside the cell. Many kinds of batteries have been developed, which have respectively different advantages and disadvantages with respect to environmental safety, economical efficiency, amount of usable electric energy, portability, storability, adaptability to use environment, and recycling efficiency. Therefore, batteries are selected in accordance with the intended use. Important technical factors common to every battery are the type of chemical reaction, the way of accelerating the reaction, and the form of the reactants during storage, supply, or recovery.

In the batteries, two kinds of chemical substances are used, which are a reducing agent that causes a reducing reaction (yielding an electron to the other reactant or pulling oxygen out of the other reactant) and an oxidizing agent that causes an oxidizing reaction (pulling an electron out of the other reactant or yielding oxygen to the other reactant). Such reactions are caused separately on two different electrodes, so that the energy of the generated electrons is drawn out of the system, while ions produced on both electrodes as a result of the generation of the electrons are neutralized within the battery. The reaction efficiency depends on the kinds of the chemical substances to be used, the manner of the reactions, the electrode materials and their activities, and the reaction environment including the electrolyte. Furthermore, the selection of substances constituting a battery is an element which determines the quality of the battery not only in terms of the quality upon use but also in terms of the characteristics upon production and waste.

For example, a lithium ion secondary battery is excellent in terms of the amount of electric energy and is rechargeable. However, since lithium is a combustible material that is very unstable upon exposure to moisture or oxygen in the air, the packaging or use environment of the battery has to be so designed that safety is sufficiently secured, in order to avert its danger. Further, since collection after use and recycling are indispensable, the entire cost from the production of the battery to the disposal is high. These problems also occur in the cases of other secondary batteries such as lead-acid battery, nickel-cadmium battery, and nickel-hydrogen battery. Also, during repetition of charging and discharging, the memory effect occurs and the electrolyte deteriorates; thus the battery performance becomes lower.

On the other hand, the storable energy of such secondary batteries is limited and charging takes a long time; therefore, they are not suitable batteries for continuously-driven devices. Considering these circumstances, a secondary battery is disclosed which can supply electric power continuously (for example, see Japanese Patent Application Laid-Open No. 7-99707); in this hydrogen fuel cell, produced water is electrolyzed to reproduce hydrogen, which is the fuel. However, since hydrogen is a combustible gas, it is difficult to store or handle hydrogen.

SUMMARY OF THE INVENTION

The present invention has been made, considering the problems of the prior art.

According to the invention, it is possible to provide a secondary battery whose electrolyte components are recycled, wherein the battery is capable of providing a sufficient electromotive force by accelerating the electrode reactions and capable of charging and discharging. The invention also provides a method of generating electric power using the battery.

The invention provides a secondary battery comprising a power generating part and a charging part,
wherein the power generating part comprises an acidic medium in which a first electrode is disposed and a basic medium in which a second electrode is disposed, the acidic medium and the basic medium are disposed adjacent to each other, at least one reactive substance is contained in at least one of the acidic medium or basic medium, and the charging part comprises reactive substance regenerating device regenerating the reactive substance from a power-generation product produced by power generation in the power generating part.

Also, the invention provides an electric power generating method comprising:
providing an acidic medium in which a first electrode is disposed and a basic medium in which a second electrode is disposed, wherein at least one reactive substance is included in at least one of the acidic medium or the basic medium; and
causing an oxidation reaction in the acidic medium and/or a reducing reaction in the basic medium by the reactive substance to generate power;
wherein the acidic medium and the basic medium are disposed adjacent to each other, the reactive substance is regenerated from a power-generation product produced by the power generation and supplied to at least one of the acidic medium or basic medium.

DESCRIPTION OF THE PRESENT INVENTION

Figure 1:
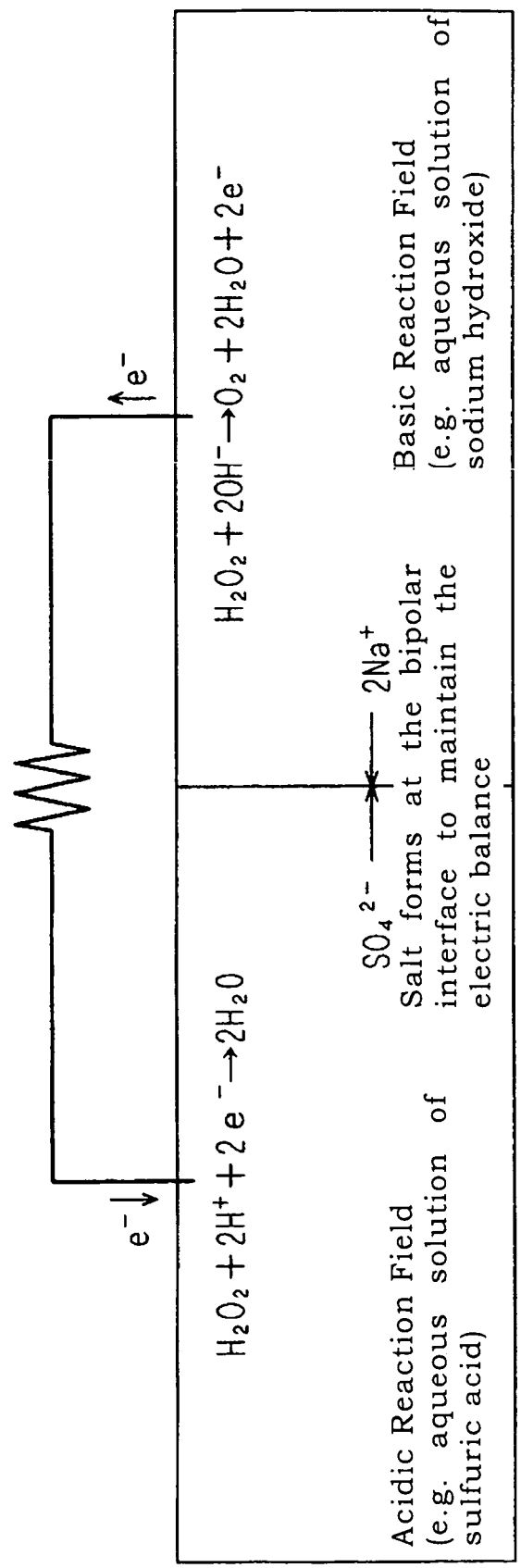
FIG. 1 is a view illustrating electric power generating mechanism of a battery according to the present invention.

An embodiment of the invention is to provide a secondary battery comprising a power generating part and a charging part, wherein
the power generating part comprises an acidic medium in which a first electrode is disposed and a basic medium in which a second electrode is disposed;
the acidic medium and the basic medium are disposed adjacent to each other;
at least one of the acidic medium or the basic medium includes at least one reactive substance; and
the charging part comprises a reactive substance regenerating device which regenerates the reactive substance from power-generation products produced by electric power generation in the power generating part.

The charging part may further comprise a medium regenerating device which regenerates the acidic medium and/or the basic medium from the power-generation products.

The acidic medium may be an acidic aqueous solution, and the basic medium may be a basic aqueous solution.

Each of the acidic medium and the basic medium may include the reactive substance(s).

The reactive substance in the acidic medium and the reactive substance in the basic medium may be the same.

Both of the acidic medium and the basic medium may include hydrogen peroxide as the reactive substance.

The reactive substance regenerating device may comprise an anode and a cathode and hydrogen peroxide may be regenerated by supplying, to the cathode, oxygen and water produced by the electric power generation.

The medium regenerating device may comprise a 3-chamber cell comprising an acid chamber, a salt chamber, and a base chamber which are formed by an anion-exchange membrane, a cation-exchange membrane, and bipolar membranes, wherein an aqueous solution of salt produced by the electric power generation is supplied to the salt chamber and subjected to an electrodialysis so that the acidic aqueous solution and the basic aqueous solution are regenerated respectively in the acid chamber and the base chamber, and the regenerated acidic aqueous solution and the regenerated basic aqueous solution are discharged from the chambers.

The acidic aqueous solution and the basic aqueous solution may flow through a flow passage in the power generating part, and the acidic aqueous solution and the basic aqueous solution may form laminar flows in the flow passage.

The acidic aqueous solution may include an acid selected from the group consisting of sulfuric acid, methane sulfonic acid, trifluoromethane sulfonic acid, hydrochloric acid, hydriodic acid, hydrobromic acid, perchloric acid, periodic acid, orthophosphoric acid, polyphosphoric acid, nitric acid, tetrafluoroboric acid, hexafluorosilicic acid, hexafluorophosphoric acid, hexafluoroarsenic acid, hexachloroplatinic acid, acetic acid, trifluoroacetic acid, citric acid, oxalic acid, salicylic acid, tartaric acid, maleic acid, malonic acid, phthalic acid, fumaric acid, and picric acid.

The basic aqueous solution may include a base selected from the group consisting of sodium hydroxide, potassium hydroxide, lithium hydroxide, calcium hydroxide, ballium hydroxide, magnesium hydroxide, ammonium hydroxide, tetramethylammonium hydroxide, tetraethylammonium hydroxide, tetrapropylammonium hydroxide, and tetrabutylammonium hydroxide, or may include an alkali metal salt selected from the group consisting of sodium carbonate, sodium hydrogencarbonate, potassium carbonate, potassium hydrogencarbonate, sodium borate, potassium borate, sodium silicate, potassium silicate, sodium tripolyphosphate, potassium tripolyphosphate, sodium aluminate, and potassium aluminate.

The acidic medium may be an acidic ion-conductive gel and the basic medium may be a basic ion-conductive gel.

The acidic ion-conductive gel may have been prepared by gelatinizing an acidic aqueous solution with water glass, anhydrous silicon dioxide, cross-linked polyacrylic acid, agar, or a salt thereof.

The basic ion-conductive gel may have been prepared by gelatinizing a basic aqueous solution with carboxymethylcellulose, cross-linked polyacrylic acid, or a salt thereof.

The first electrode may comprise a material selected from the group consisting of platinum, platinum black, platinum-oxide clad platinum, silver, gold, titanium whose surface was passivated, stainless steel whose surface was passivated, nickel whose surface was passivated, aluminum whose surface was passivated, carbonic structure, amorphous carbon, and glassy carbon.

The second electrode may comprise a material selected from the group consisting of platinum, platinum black, platinum-oxide clad platinum, silver, gold, titanium whose surface was passivated, stainless steel whose surface was passivated, nickel whose surface was passivated, aluminum whose surface was passivated, carbonic structure, amorphous carbon, and glassy carbon.

The first and second electrodes may each independently be in a form of a plate, a thin membrane, a mesh, or a fiber.

The first and second electrodes may have been produced by providing electrode materials on electrode substrates by electroless plating, vapor-deposition, or sputtering.

The reactive substance regenerating device may further comprise a direct-current source which applies a direct-current voltage between the anode and the cathode.

Another embodiment of the invention is to provide an electric power generating method, comprising:
providing an acidic medium in which a first electrode is disposed and a basic medium in which a second electrode is disposed, wherein at least one reactive substance is included in at least one of the acidic medium or the basic medium; and
causing an oxidation reaction in the acidic medium and/or a reduction reaction in the basic medium by the reactive substance to generate power;
wherein the acidic medium and the basic medium are disposed adjacent to each other, the reactive substance is regenerated from a power-generation product produced by power generation and supplied to at least one of the acidic medium or basic medium.

Hereinafter, a secondary battery and a method of generating electric power according to the present invention will be explained in detail.

Secondary Battery

A secondary battery according to the present invention, roughly classified, is comprised of (1) power generating part and (2) charging part.

1 Power Generating Part

The power generating part comprises an acidic medium in which a first electrode is disposed and a basic medium in which a second electrode is disposed. And, the acidic medium and basic medium are disposed adjacent to each other. Further, the acidic medium includes a reactive substance (reactive substance S) and/or the basic medium includes a reactive substance (reactive substance T).

The battery according to the invention is a bipolar-type battery comprising the above elements. The battery can be a secondary battery when provided with regenerating device of the charging part, which is described below. The term, "a bipolar-type battery", refers to a battery comprising an acidic medium and a basic medium disposed adjacent to each other, wherein the media include electrodes and at least one of the media includes a substance (reactive substance) for generating an electric energy. The term "a reactive substance" used herein refers to a substance which generates electricity in a bipolar-type battery. The reactive substance S and T described below are examples of the reactive substance.

The reactive substance S and/or the reactive substance T cause(s) the electrode reaction(s) on the positive pole and/or the negative pole through the following action. In this way, the reactive substance S and/or the reactive substance T enable(s) highly efficient power generation. Consequently, if the acidic medium does not include the reactive substance S and the basic medium does not include the reactive substance T, the electromotive force is insufficient for use as a battery.

For example, when the acidic medium includes the reactive substance S and the basic medium includes the reactive substance T, the reactive substance S and a hydrogen ion in the acidic medium abstract an electron from a first electrode and the reactive substance T and a hydroxide ion in the basic medium donate an electron to a second electrode.

Especially, in the secondary battery according to the invention, the following two reactions proceed simultaneously to generate electric energy that can drive an external circuit: (1) the reactive substance S and a hydrogen ion in the acidic medium or in the vicinity of the first electrode contacting the acidic medium abstract an electron from the first electrode, (the oxidation reaction); and (2) the reactive substance T and a hydroxide ion in the basic medium or in the vicinity of the second electrode contacting the basic medium donate an electron to the second electrode, (the reduction reaction).

In the bipolar reaction field in the battery of the invention, hydrogen ions in the acidic medium are involved in deprivation of electrons of the first electrode caused by the reactive substance S. An increase in hydrogen ion concentration in the acidic medium accelerates the reaction; in other words, the chemical equilibrium shifts to the product side. On the other hand, hydroxide ions in the basic medium participate in donation of electrons to the second electrode caused by the reactive substance T. An increase in hydroxide ion concentration in the basic medium accelerates the reaction. Therefore, it is possible to accelerate the reactions and to enhance the power generation by increasing the hydrogen ion concentration in the acidic medium (decrease in pH) and by increasing the hydroxide ion concentration in the basic medium (increase in pH). Accordingly, the output of the battery of the invention can be increased by controlling pH values in the respective media.

Hereinafter, the respective elements composing the power generating part will be explained.

(Acidic Medium and Basic Medium)

In the invention, the term "acidic medium" refers to a medium whose pH value is less than 7 (preferably 3 or less) and which can preferably form an acidic reaction field where hydrogen ions exist. Also, the term "basic medium" refers to a medium whose pH value is more than 7 (preferably 11 or more) and which can preferably form a basic reaction field where hydroxide ions exist.

The acidic medium and the basic medium may each independently be in a state of liquid, gel, or solid. Preferably, they are in the same state. Also, the acidic medium and the basic medium may each independently comprise an organic compound or an inorganic compound.

The combination of the acidic medium and the basic medium may be preferably a combination of an acidic aqueous solution such as an aqueous solution of sulfuric acid, hydrochloric acid, or phosphoric acid and a basic aqueous solution such as an aqueous solution of sodium hydroxide, potassium hydroxide, ammonia, or an ammonia compound; or a combination of an ion-conductive gel prepared by gelatinizing any of the acidic aqueous solutions with a gelling agent and an ion-conductive gel prepared by gelatinizing any of the basic aqueous solutions with a gelling agent.

More specifically, the acidic aqueous solution is preferably an aqueous solution comprising one or more acids selected from the group consisting of sulfuric acid, methane sulfonic acid, trifluoromethane sulfonic acid, hydrochloric acid, hydriodic acid, hydrobromic acid, perchloric acid, periodic acid, orthophosphoric acid, polyphosphoric acid, nitric acid, tetrafluoroboric acid, hexafluorosilicic acid, hexafluorophosphoric acid, hexafluoroarsenic acid, hexachloroplatinic acid, acetic acid, trifluoroacetic acid, citric acid, oxalic acid, salicylic acid, tartaric acid, maleic acid, malonic acid, phthalic acid, fumaric acid, and picric acid. The acidic aqueous solution is more preferably an aqueous solution comprising sulfuric acid, hydrochloric acid, nitric acid, or phosphoric acid, each of which is a strong acid.

The basic aqueous solution is preferably an aqueous solution comprising one or more bases selected from the group consisting of sodium hydroxide, potassium hydroxide, lithium hydroxide, calcium hydroxide, ballium hydroxide, magnesium hydroxide, ammonium hydroxide, tetramethylammonium hydroxide, tetraethylammonium hydroxide, tetrapropylammonium hydroxide, and tetrabutylammonium hydroxide, or an aqueous solution comprising one or more alkali metal salts selected from the group consisting of sodium carbonate, sodium hydrogencarbonate, potassium carbonate, potassium hydrogencarbonate, sodium borate, potassium borate, sodium silicate, potassium silicate, sodium tripolyphosphate, potassium tripolyphosphate, sodium aluminate, and potassium aluminate. The basic aqueous solution is more preferably an aqueous solution comprising sodium hydroxide or potassium hydroxide, each of which is a strong base.

The acidic ion-conductive gel, which serves as the acidic medium, is preferably a material prepared by gelatinizing any of the above acidic aqueous solutions with a gelling agent such as water glass, anhydrous silicon dioxide, cross-linked polyacrylic acid, or salts thereof.

The basic ion-conductive gel, which serves as the basic medium, is preferably a material prepared by gelatinizing any of the above basic aqueous solutions with a gelling agent such as carboxymethyl cellulose, cross-linked polyacrylic acid, or salts thereof.

The acidic aqueous solution may comprise only a single kind of acid or may comprise two or more kinds of acids. The basic aqueous solution may comprise only a single kind of base or may comprise two or more kinds of bases. Similarly, the acidic ion-conductive gel may comprise only a single kind of acid or may comprise two or more kinds of acids. The basic ion-conductive gel may comprise only a single kind of base or may comprise two or more kinds of bases.

In the power generating part, the acidic medium and basic medium have to be disposed adjacent to each other, in order to enable maintenance of the electric balance. The electric balance is maintained by allowing counter-anions of hydrogen ions in the acidic medium and counter-cations of hydroxide ions in the basic medium to form salts thereof. If the media are an acidic aqueous solution and a basic aqueous solution, the acidic medium and the basic medium may be separated from each other by a membrane permeable to the counter-anions and/or the counter-cations or may be separated from each other with a salt bridge connecting the acidic medium with the basic medium through which the counter-anions and/or counter-cations can migrate. It is neither required that the entire acidic medium be adjacent to the basic medium nor that the entire basic medium be adjacent to the acidic medium. As long as at least a part of the acidic medium is adjacent to at least a part of the basic medium, the media can be used in the invention. It should be noted that the scope of the term "adjacent to each other" used herein includes the state of "being separated but ionically connected by a means such as a salt bridge."

(Reactive Substance)

The reactive substance S may be any substance as long as the substance (oxidizing agent) is capable of causing, together with hydrogen ions, the oxidization reaction in which electrons are abstracted from the first electrode in the acidic medium. The reactive substance T may be any substance as long as the substance (reducing agent) is capable of causing, together with hydroxide ions, the reduction reaction in which electrons are donated to the second electrode in the basic medium.

In the following, a preferred embodiment of the invention is explained with details of the reactive substance S in the acidic medium and the reactive substance T in the basic medium.

The reactive substance S is preferably a substance which causes the oxidation reaction more efficiently at a higher hydrogen ion concentration. Specifically, the reactive substance S may be hydrogen peroxide, oxygen, or a hypohalogenous acid such as hypochlorous acid, hypobromous acid, or hypoiodous acid. There are some ways of adding the reactive substance S to the acidic medium. The reactive substance S may be incorporated in a liquid, then the liquid may be added to the acidic medium; or a liquid which releases the reactive substance S by a chemical reaction may be added to the acidic medium.

The reactive substance T is preferably a substance which causes the reduction reaction more efficiently at a higher hydroxide ion concentration. Specifically, the reactive substance T may be hydrogen peroxide, hydrogen, or hydrazine. There are some ways of adding the reactive substance T to the basic medium. The reactive substance T may be incorporated in a liquid, then the liquid may be added to the basic medium; or a liquid which releases the reactive substance T by a chemical reaction may be added to the basic medium.

The reactive substance S or the reactive substance T may be a metal ion capable of changing its valency through a redox reaction or a metal complex of such a metal, wherein examples the metal include iron, manganese, chromium and vanadium. There are some ways of adding such a metal or metal complex to the acidic medium or the basic medium. The metal or metal complex may be incorporated in a liquid, then the liquid may be added to the acidic medium or the basic medium; or a liquid which releases the metal or metal complex by a chemical reaction may be added to the acidic medium or the basic medium.

Particularly preferably, the reactive substance S and the reactive substance T are comprised of the same substance. The substance is a substance having such characteristics that the substance and hydrogen ions cause the oxidization reaction in which electrons are abstracted from the first electrode in the acidic medium and that the substance and hydroxide ions cause the reduction reaction in which electrons are donated to the second electrode in the basic medium. If the reactive substance S and the reactive substance T are comprised of the same substance, there are advantages as described in the following: the battery structure becomes simple, greater freedom is given to the selection of the separation membrane separating chemical substances on the positive pole side from chemical substances on the negative pole side, and the separation membrane is unnecessary if the acidic medium and the basic medium can be maintained unmixed without the separation membrane. Especially, limitation on the freedom of the selection of the separation membrane is a big issue of the conventional batteries.

Hydrogen peroxide is particularly preferable as the substance which can be used as both oxidizing agent and reducing agent, the reason being explained in detail below. It is preferable to use a liquid containing hydrogen peroxide or a liquid which releases hydrogen peroxide by a chemical reaction for adding hydrogen peroxide, since the handling is easier. The "liquid" used for adding hydrogen peroxide may be in any form of a solution (whose solvent may be water, an organic solvent, or the like), a liquid dispersion, or a gel. It is preferable to select a suitable form of the liquid in accordance with the combination of the acidic medium and the basic medium.

The ratio of the hydrogen ion concentration to the hydrogen peroxide concentration in the acidic medium ([hydrogen ion concentration]:[hydrogen peroxide concentration]) is preferably 2:1. The ratio of the hydroxide ion concentration to the hydrogen peroxide concentration in the basic medium ([hydroxide ion concentration]:[hydrogen peroxide concentration]) is preferably 2:1. When each ratio is satisfied, the reaction proceeds in just proportion with respect to the amounts of participating reactants, as is apparent from the reaction formula shown below. More preferably, the hydrogen ion concentration in the acidic medium is the same as the hydroxide ion concentration in the basic medium.

There are several ways of adding hydrogen peroxide to each medium. For example, hydrogen peroxide may be mixed with or dispersed in the medium before the reaction starts; or hydrogen peroxide may be added to the medium through a flow path which is disposed adjacent to the electrode; or hydrogen peroxide may be added to the medium by utilizing introduction into the capillary tube; or hydrogen peroxide may be added directly to the medium.

According to the above-described constitution, if a hydrogen ion $H^+$ and a hydroxide ion $OH^-$ participate in the electrode reactions, the reactive substance S and hydrogen ions cause an oxidization reaction in the acidic medium in which electrons are abstracted from the first electrode and the reactive substance T and hydroxide ions cause a reducing reaction in the basic medium in which electrons are donated to the electrode. In this case, the electromotive force accompanying the oxidization reaction in the acidic medium, in principle, is greater than that in a basic medium. This is because, in the acidic medium with a high concentration of hydrogen ion which participates in the reaction, chemical equilibrium is near the product side and the oxidation potential is high, in comparison with the reaction in a basic medium. Also, the electromotive force accompanying the reducing reaction within the basic medium is, in principle, greater than that in an acidic medium. This is because, in the basic medium with a high concentration of hydroxide ion which participates in the reaction, chemical equilibrium is near the product side and the oxidation potential is low, in comparison with the reaction in an acidic medium.

As described above, the electromotive force in the bipolar battery of the invention is developed mainly by redox reactions on the electrodes. Therefore, the power generation by the bipolar battery of the present invention can be more stable than conventional neutralization-type batteries whose electromotive force is mainly developed by neutralization occurring in various areas in the battery.

(First Electrode and Second Electrode)

In the invention, the first electrode is a positive electrode and the second electrode is a negative electrode. The electrode materials of the first and second electrodes may be selected from the materials used in conventional batteries. More specifically, the first electrode material (positive pole material) may be, for example: platinum; platinum black; platinum-oxide-clad platinum; silver; gold; a metal such as titanium, stainless steel, nickel, or aluminium each of which has a passive film on its surface; a carbonic structure such as graphite or carbon nanotube; amorphous carbon; or glassy carbon. From the viewpoint of durability, platinum, platinum black, and platinum-oxide-clad platinum are more preferable.

The second electrode material (negative pole material) may be, for example: platinum; platinum black; platinum-oxide-clad platinum; silver; gold; a metal such as titanium, stainless steel, nickel, or aluminium each of which has a passive film on its surface; a carbonic structure such as graphite or carbon nanotube; amorphous carbon; or glassy carbon. From the viewpoint of durability, platinum, platinum black, and platinum-oxide-clad platinum are more preferable.

In the invention, the first and second electrodes are preferably in the form of a plate, a thin membrane, a mesh, or a fiber. In an embodiment of the invention, the electrodes are particularly preferably in the form of a mesh so that the electrodes serve as an exhaust flow passage for the gas generated within the battery. Here, the term "the electrode in the form of a mesh" means that the electrode is porous and has through-passages which the generated gas can pass through.

The electrode in the form of a mesh may be produced by providing the electrode material onto a metal mesh, a punched metal plate, or a foamed metal sheet by the electroless plating method, the vapor deposition method, or the sputtering method. As an alternative, the electrode in the form of a mesh may be produced by providing the electrode material onto a cellulose sheet or a synthetic polymer sheet by any of the above methods or by a combination of two or more of the methods.

Further, when the acidic medium and/or the basic medium comprises a material which do not change its shape much such as ion-exchange resin or an ion-conductive gel, the first electrode and/or the second electrode is preferably prepared by providing the electrode material onto such an ion-exchange resin or such an ion-conductive gel by the electroless plating method, the vapor deposition method, or the sputtering method.

2 Charging Part

The charging part has reactive substance regenerating device regenerating the reactive substance S and/or the reactive substance T from the power-generation products formed in the process of the power generation in the power generating part. For example, when hydrogen peroxide is used as the reactive substance S and the reactive substance T, the power-generation products include oxygen and water, and hydrogen peroxide is regenerated from the power-generation products by the reactive substance regenerating device.

The reactive substance S and/or the reactive substance T such as hydrogen peroxide can by regenerated by a known technique (for example, Journal of Applied Electrochemistry Vol.25 613-(1995) can be referenced). For example, when hydrogen peroxide is used, hydrogen peroxide is preferably regenerated by providing a reactive substance regenerating device having positive and negative poles and supplying the power-generation products to the negative pole. By synthesizing (regenerating) hydrogen peroxide from water and oxygen produced in the power generation reaction, it becomes unnecessary to supply substances from the outside.

Also, the charging part preferably further comprises medium regenerating device that regenerates the acidic medium and/or the basic medium from the power-generation products.

The acidic medium and/or the basic medium can be regenerated by a known technique (for example, techniques disclosed in Japanese Patent Application Laid-Open No. 7-178319) for electrically synthesizing acids and bases. For example, when the acidic medium is an aqueous solution of sulfuric acid and the basic medium is an aqueous solution of sodium hydroxide, the aqueous solution of sulfuric acid and the aqueous solution of sodium hydroxide are regenerated from the aqueous solution of sodium sulfate which arose in the electrode reactions by electrodialysis using a 3-chamber cell (comprising a salt chamber, an acid chamber, and a base chamber) comprising a cation-exchange membrane, a bipolar membrane, and an anion-exchange membrane.

By regenerating the reactive substances, the acidic medium, and the basic medium in the charging part, the electromotive force is likely to recover by charging, and the reaction field can be maintained fresh. The reason for this is that the secondary battery of the invention (especially when hydrogen peroxide is used as the reactive substance S and/or the reactive substance T) has simpler constitution than the lithium secondary battery. Accordingly, the electromotive force of the secondary battery of the invention is less likely to decrease when it is used repeatedly than in the case of other secondary batteries.

If the charging, which is the regeneration of the above-described substances, is conducted by a method such as an electrolysis cell, the battery of the invention can be capable of generating power while charged by a commercially available power source or a solar battery. Thereby, the battery can supply stable electric power continuously. The electrical energy generated by the secondary battery of the invention can be controlled by selecting an appropriate acidic medium, an appropriate basic medium, and an adequate concentration of the reactive substance S and/or the reactive substance T. Particularly, when the secondary battery is used for supplying power to an apparatus whose power consumption is not constant, it is not always necessary to change the power generated by the secondary battery in accordance with the change in the power consumption. If the battery constantly generates an amount of electric power which is larger than the maximum power consumption, it is not necessary to change the amount of the electric power. The surplus amount of the electric power may be used to assist the power generation; in other words, the surplus power may be used for driving the charging part of the secondary battery. Therefore, according to the invention, it is possible to provide a secondary battery comprising hydrogen peroxide as a reactive substance which can be used at home as a power source for the consumer electronics which are usually run continuously. Refrigerators are examples of such consumer electronics.

When the acidic medium or the basic medium is in the form of a gel, the gel can be regenerated by the following process. An aqueous solution of the salt (neutralization salt) developed by the neutralization accompanying the electrode reaction is discharged from the gel, and the acidic aqueous solution or the basic aqueous solution is supplied to the gel, wherein the acidic aqueous solution or the basic aqueous solution is an aqueous solution regenerated from the aqueous solution of the salt.

3 Preferred Embodiment of the Secondary Battery According to the Invention

Hereinafter, a preferred embodiment of the secondary battery of the invention will be explained with reference to the drawings. However, the invention is not limited to the embodiment. For the sake of convenience in the explanation, the secondary battery of the invention will be explained using a secondary battery comprising hydrogen peroxide as the reactive substance S and/or the reactive substance T as an example.

Figure 2:
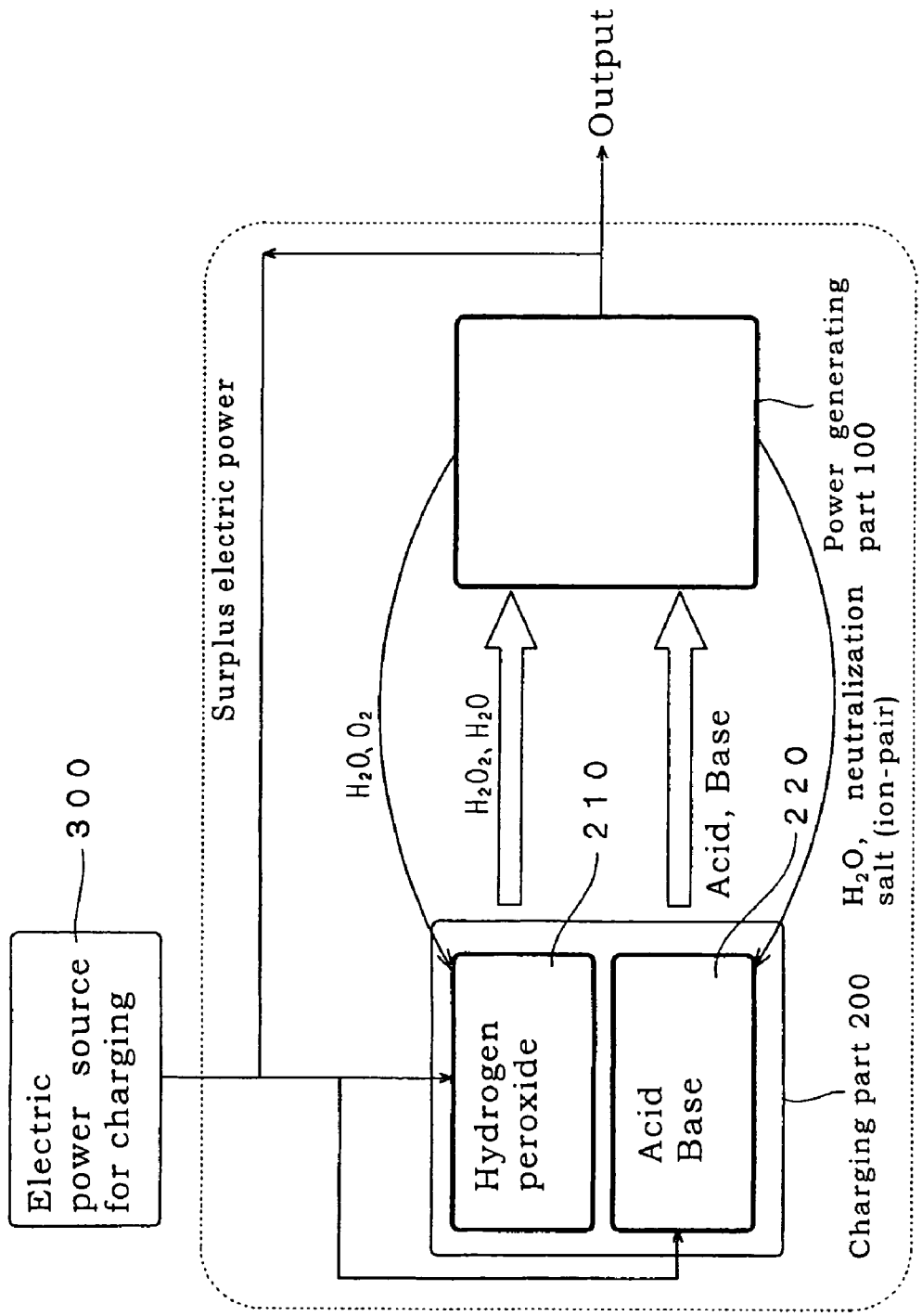
FIG. 2 is an explanatory view illustrating the constitution of a secondary battery according to the invention.

The secondary battery illustrated in FIG. 2 is comprised of a power generating part 100 and a charging part 200, and is provided with a power source 300 for charging. The charging part 200 comprises a reactive substance regenerating device 210 which regenerates hydrogen peroxide and medium regenerating device 220 which regenerates the acidic medium and/or basic medium.

The power generating part 100 has an acid-base bipolar reaction field in which a liquid such as aqueous solution of sulfuric acid is used as the acidic medium and a liquid such as aqueous solution of sodium hydroxide is used as the basic medium. As described later, as the power generation proceeds, oxygen, water, and sodium sulfate are produced, as the power-generation products, from hydrogen peroxide, the aqueous solution of sulfuric acid, and sodium hydroxide. When the electromotive force is lowered by the increase in amounts of these power-generation products, charging is conducted in the charging part 200.

In the electrical charging, the following processes are conducted. First, oxygen and water are supplied to the reactive substance regenerating device 210 and converted to hydrogen peroxide by using the power source 300. The regenerated hydrogen peroxide is supplied to the acidic medium and/or basic medium in the power generating part. Sodium sulfate, which was developed by the neutralization, is supplied to the medium regenerating device and converted to sulfuric acid and sodium hydroxide by using the power source 300. The regenerated sulfuric acid and sodium hydroxide are supplied respectively to the acidic medium and basic medium. The electric power generation and electrical charging of the secondary battery according to the invention are conducted in the above-described way.

A specific construction of the power generating part is explained in the following with reference to FIGS. 3A and 3B.

Figure 3A:
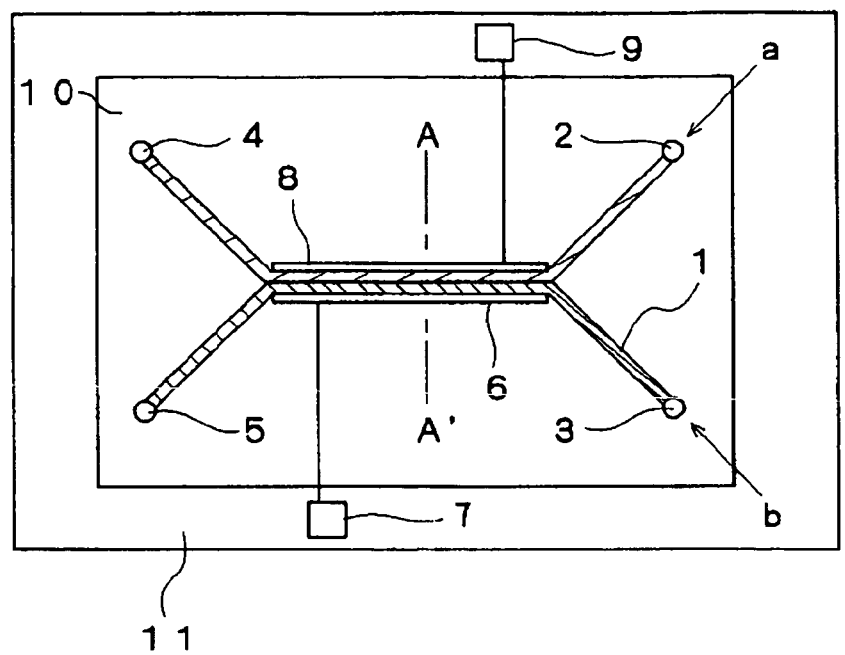
FIG. 3A is a schematic perspective top view of an embodiment of power generating part of the battery according to the invention.
Figure 3B:
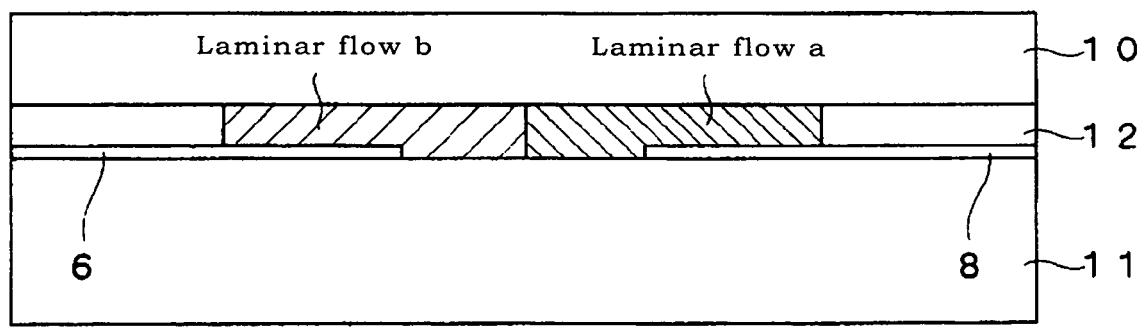
FIG. 3B is a cross-sectional view of the power generating part of FIG. 3A, taken on line A-A' as viewed from the upstream side of the media flows.

FIG. 3A is a schematic perspective top view of the power generating part. As illustrated in FIG. 3A, in the power generating part, there is a spacer (spacer 12 in FIG. 3B) between a slide glass 11 and a cover glass 10, so that a capillary flow passage 1 (50 μm deep and 1000 μm wide) is formed. This capillary flow passage 1 has an inlet 2 and an inlet 3 through which a liquid acidic medium and a liquid basic medium are introduced, and an outlet 4 and an outlet 5 through which the liquid media are discharged. For example, when an acidic aqueous solution (a) and a basic aqueous solution (b) are introduced into the capillary flow passage 1 through the inlet 2 and the inlet 3 respectively, with an adequate viscosity and an adequate flow velocity of each aqueous solution, a laminar flow (Reynolds flow) is formed in the portions on the capillary flow passage 1 where the aqueous solutions flow side-by-side.

This laminar flow is explained in the following with reference to FIG. 3B. FIG. 3B is a sectional view taken on line A-A' viewed from the upstream side of the media flows. As illustrated in FIG. 3B, even in the portions on the capillary flow passage 1 where the acidic aqueous solution (a) and basic aqueous solution (b) flow side-by-side, a laminar flow (a) of the acidic aqueous solution (a) and the laminar flow (b) of the basic aqueous solution (b) form. Therefore, while the aqueous solutions contact each other, they flow through the capillary passage 1 without intermingling with each other. Since the laminar flow (a) and laminar flow (b) go through the portion where the aqueous solutions contact each other and are separated from each other at the bifurcation point, the acidic aqueous solution (a) is discharged from the outlet 4 and the basic aqueous solution (b) is discharged from the outlet 5. In this way, each aqueous solution is recovered separately.

At the bottom of the portions on the capillary flow passage 1 where the laminar flows are formed side-by-side, two electrodes 6 and 8 are provided, so that the electric power can be supplied to the outside through connection terminals 7 and 9, which are connected to the electrode 6 and the electrode 8 respectively.

The characteristics of the viscous fluids can be used to prevent the fluids from intermingling with each other even when the fluids contact each other. Reynolds flow phenomenon occurs when Reynolds number (Re), which is determined by the viscosity and flow rate of a fluid and the shape of the flow passage (the passage diameter or the passage width, the passage depth etc.,), is approximately 2000 or less. When the fluids have such viscosities and flow rates that Reynolds phenomenon occurs, the flows of the fluids are laminar flows, thus hardly intermingle with each other. Therefore, if (1) the reactive substance S is included in the acidic aqueous solution, (2) the reactive substance T is included in the basic aqueous solution, and (3) an electrode is disposed in each aqueous solution, then the oxidization reaction occurs in the acidic medium and the reduction reaction occurs in the basic medium, so that an electromotive force is developed to form a battery.

If this power generating part is used as a unit cell, the electric current is increased by connecting plural unit cells in parallel, and the voltage is increased by connecting plural unit cells in series. The complex structure of the capillary flow passage can easily be created by applying an existing processing technique such as ultrasonic grinding, semiconductor photolithography, sand blast, injection forming, or silicon resin molding, to a substrate (chip) made of a material such as glass, quartz, silicon, polymer film, plastic resin, ceramic, graphite, or metal. Accordingly, power generating part having a desired performance (electric current and voltage) can be produced by integrating the unit cells and laminating multiple chips.

The reactive substance regenerating device in the charging part may be, for example, an electrolysis cell having an anode and a cathode, in which the oxygen and water produced in the power generation reaction are supplied to the cathode to produce hydrogen peroxide.

Also, the medium regenerating device may be, for example, a 3-chamber cell comprising a salt chamber, an acid chamber, and a base chamber formed by a cation-exchange membrane, bipolar membranes, and an anion-exchange membrane. The aqueous solution of the salt (sodium sulfate) developed by the power generation reaction is supplied to the salt chamber, the aqueous solution is subjected to electrodialysis, and an acidic aqueous solution and a basic aqueous solution are discharged from the acid chamber and the base chamber respectively.

The power source for the charging part may be a commercially available power source, a solar battery, or a surplus of the electric power generated by the battery of the invention. The secondary battery includes the power generating part and the charging part.

When an aqueous solution of sulfuric acid is used as the acidic medium and an aqueous solution of sodium hydroxide is used as the basic medium, oxygen gas and an aqueous solution of sodium sulfate are produced by the electric-power generation reaction. In the charging part, hydrogen peroxide, the aqueous solution of sulfuric acid, and the aqueous solution of sodium hydroxide are regenerated from the power-generation products.

A specific constitution of the charging part is described in the following with reference to FIGS. 4 through 6.

Figure 4:
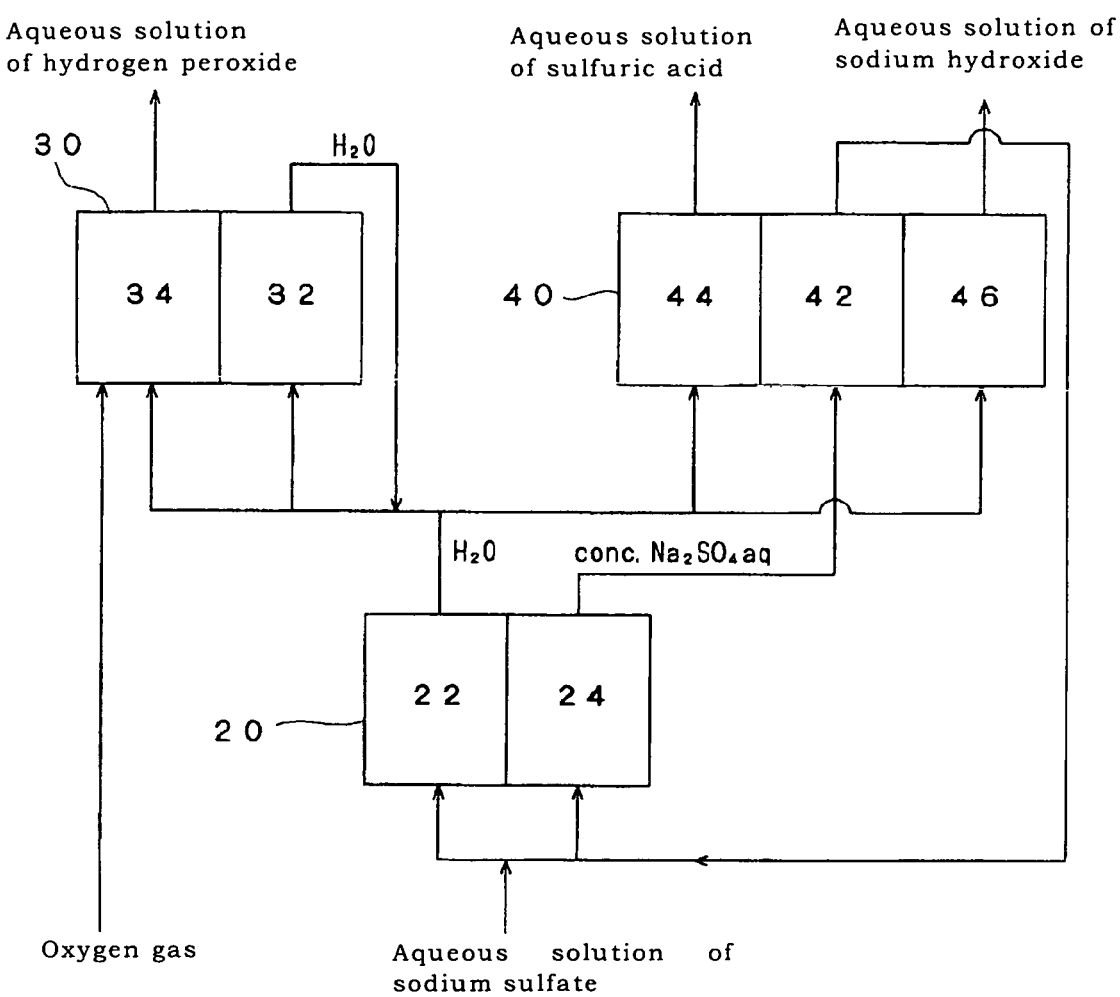
FIG. 4 is an explanatory view schematically illustrating the entire constitution of the charging part.

FIG. 4 is an explanatory view schematically illustrating the entire construction of the charging part. First, an aqueous solution of sodium sulfate is supplied to an electrodialysis bath 20. The electrodialysis bath 20 comprises a desalting chamber 22 and a concentrating chamber 24 formed by a cation-exchange membrane and an anion-exchange membrane, or by alternate membranes of cation-exchanger and anion-exchanger. An anode and a cathode are disposed at opposite ends of the electrodialysis bath 20, and the electrodialysis is conducted by applying a direct-current voltage to the anode and cathode. As the result, partially desalted water is produced in the desalting chamber 22, a concentrated aqueous solution of sodium sulfate is produced in the concentrating chamber 24. The partially desalted water is supplied to a cathode chamber 34 of a reactive substance regenerating device 30, an anode chamber 32 of the reactive substance regenerating device 30, a salt chamber 42 of a medium regenerating device 40, an acid chamber 44 of the medium regenerating device 40, or a base chamber 46 of the medium regenerating device 40, in accordance with the necessity. Also, the concentrated aqueous solution of sodium sulfate is supplied to the salt chamber 42 of the medium regenerating device 40.

Figure 5:
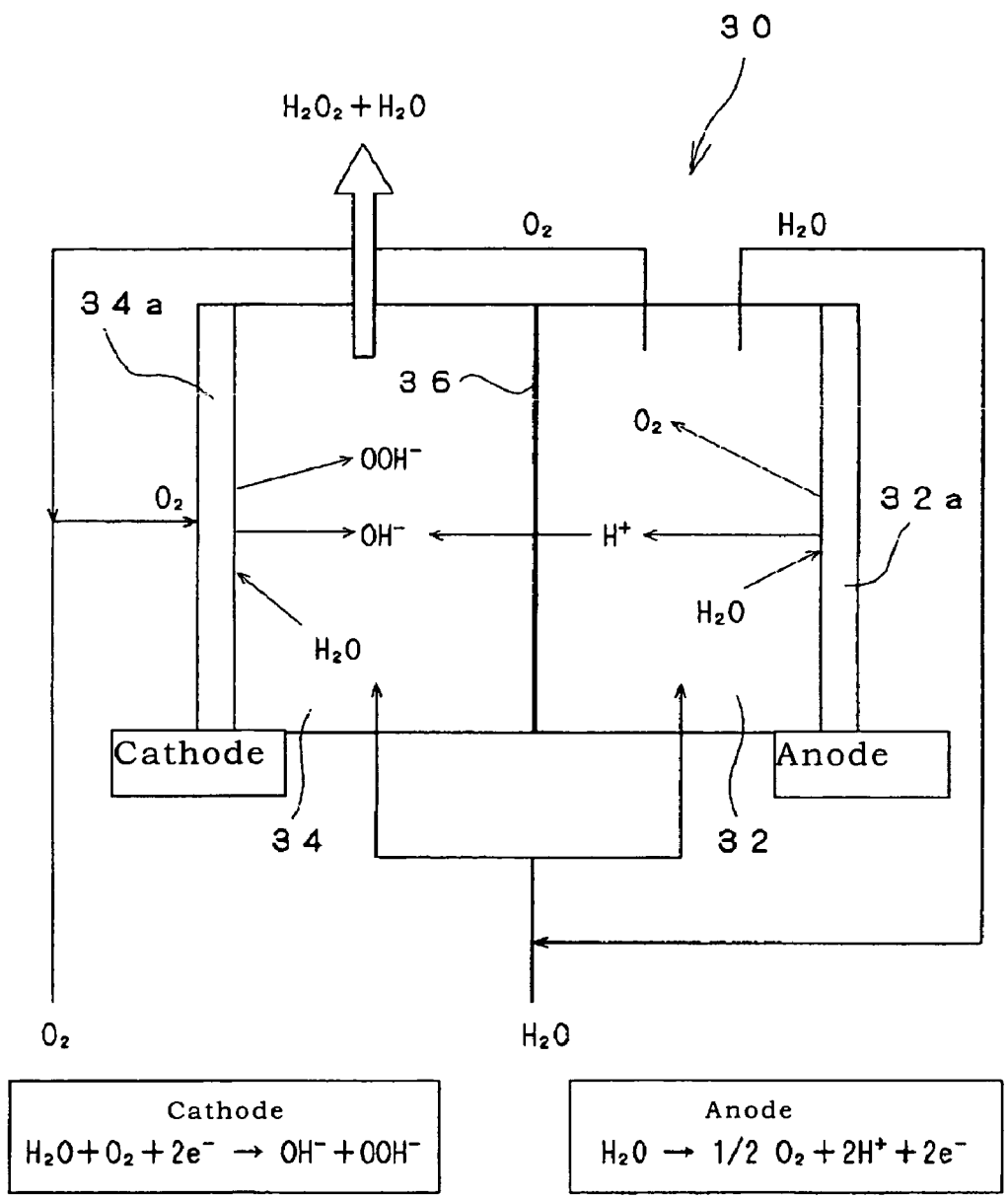
FIG. 5 is an explanatory view schematically illustrating the constitution of the reactive substance regenerating device.

The reactive substance regenerating device (the reference numeral 30 in FIG. 4) which regenerates hydrogen peroxide, as illustrated in FIG. 5, comprises an electrolytic cell structure in which the anode chamber 32 having an anode 32a disposed therein and the cathode chamber 34 having a cathode 34a disposed therein are partitioned by a diaphragm membrane 36. The water is supplied from the desalting chamber 22 to the anode chamber 32 and to the cathode chamber 34, while the oxygen produced by power generation is supplied to the cathode chamber 34. A direct-current voltage is applied between the anode 32a and cathode 34a so that hydrogen peroxide is produced at the cathode 34a. An aqueous solution of hydrogen peroxide is regenerated in this way. The aqueous solution of hydrogen peroxide produced in the cathode chamber 34 is supplied to the power generating part. The liquid (water) in the anode chamber 32 is recirculated to the reactive substance regenerating device 30. Practically, there are no disadvantages to using the partially desalted water (actually, a dilute aqueous solution of sodium sulfate) produced in the desalting chamber 22 in FIG. 4 for the regeneration of the aqueous solution of hydrogen peroxide.

The reference numeral 40 in FIG. 4 represents a medium regenerating device used to regenerate the acidic medium and basic medium. As illustrated in FIG. 6, the medium regenerating device 40 comprises an electrodialysis bath comprising the salt chamber 42, acid chamber 44, and base chamber 46 formed by a combination of a cation-exchange membrane 47, an anion-exchange membrane 48, and bipolar membranes 49. The aqueous solution of sodium sulfate is supplied from the concentrating chamber 24 shown in FIG. 4 to the salt chamber 42 of the medium regenerating device 40, which is an electrodialysis bath comprising the bipolar membranes. Electrodialysis involving decomposition of water is conducted by applying a direct-current voltage to the anode and cathode disposed at the opposite ends of the medium regenerating device 40. As a result, in the acid chamber 44, sulfuric acid is regenerated from the hydrogen ions developed by the decomposition of water on the bipolar membrane 49 and the sulfate ions migrating from the salt chamber 42. In the base chamber 46, sodium hydroxide is regenerated from the hydroxide ions developed by the decomposition of water on the bipolar membrane 49 and the sodium ions migrating from the salt chamber 42. A part of the water discharged from the desalting chamber 22 is supplied to the acid chamber 44 and the base chamber 46 in order to adjust the concentrations of the acid and the base, and the acid solution and the base solution are supplied to the power generating part. The solution supplied to the base chamber 42 is converted to partially desalted water, which is returned to the medium regenerating device 40.

Owing to the function of the above-described charging part, the battery with the simple constitution can be charged and discharged while components in the electrolytes are recycled such as the acidic medium, basic medium, reactive substance S and reactive substance T.

When there are two reactive substances, the reactive substance regenerating device may be provided for each of the reactive substances. For example, when the reactive substance S and the reactive substance T are different, the reactive substance regenerating device may be provided for each of the reactive substances.

Method of Generating Electric Power

In the method for generating electric power according to the invention, power is generated by an oxidization reaction in the acidic medium and/or by an reduction reaction in the basic medium caused by at least one reactive substance included in the acidic medium and/or the basic medium wherein the acidic medium and the basic medium are adjacent to each other, a first electrode is disposed in the acidic medium, and a second electrode is disposed in the basic medium. In the method, each reactive substance is regenerated from the power-generation products and supplied to the acidic medium and/or the basic medium.

The electric-power generating method of the invention can be used by, for example, using the secondary battery of the invention.

According to the electric-power generating method of the invention, the electromotive force developed by the oxidization and reduction reactions is the main source of power supply voltage of the battery. Therefore, it is possible to supply stable electric power. Also, the battery with simple constitution can be charged and discharged while components in the electrolytes are recycled such as the acidic medium, basic medium, and reactive substances.

When the secondary battery of the invention is used, the electric-power generating mechanism involved in the electric-power generating method of the invention is as described in the following.

The reactive substance S and hydrogen ions contained in the acidic medium abstract electrons from the first electrode and reactive substance T and hydroxide ions contained in the basic medium donate electrons to the second electrode. Electric power is generated in this way.

Through these reactions, the reactive substance S and the reactive substance T are chemically converted to several compounds having lower total energy than the original reactive substances while the difference in the total energy amount can be retrieved from the system in the form of electric energy.

Especially, in an embodiment, the acidic medium comprises an acidic aqueous solution, the basic medium comprises a basic aqueous solution, and the reactive substances S and T are hydrogen peroxide. In this embodiment, hydrogen peroxide is decomposed to produce water and oxygen. In the embodiment, the decomposition reaction is a combination of two separate reactions occurring on different electrodes. In this case, the decomposition reaction develops an electromotive force since hydrogen peroxide is oxidative in the acidic reaction field but is reductive in the basic reaction field. The method for generating electric-power according to the invention utilizes such an acid-base bipolar reaction field.

The electric-power generating method of the invention is described more specifically in the following with reference to FIG. 1. As illustrated in FIG. 1, in the acidic reaction field (the acidic medium) in which a positive pole (the first electrode) is disposed, hydrogen peroxide acts as an oxidizing agent. In the acidic medium, the oxygen atoms of hydrogen peroxide receives electrons from the first electrode, so that water is produced, as shown in the following formula 1. However, in the basic reaction field (the basic medium) in which a negative pole (the second electrode) is disposed, the hydrogen peroxide acts as a reducing agent. In the basic medium, the oxygen atoms of hydrogen peroxide donates electrons to the second electrode to produce oxygen molecule and water as shown in the following formula 2. Owing to these reactions, the electromotive force is developed to generate electric power.

$$H_2O_2(aq) + 2H^+ + 2e^- \rightarrow 2H_2O \quad \text{(Formula 1)}$$

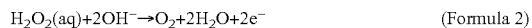

$$H_2O_2(aq) + 2OH^- \rightarrow O_2 + 2H_2O + 2e^- \quad \text{(Formula 2)}$$

In the formulas, "(aq)" represents a hydrated state.

In the reaction fields, the counter-anion of the hydrogen ion in the acidic medium, which is sulfate ion $SO_4^{2-}$ in the case of FIG. 1, and the counter-cation of the hydroxide ion in the basic medium, which is sodium ion $Na^+$ in the case of FIG. 1, migrate in opposite directions, so that electric-charge balance can be maintained. In an aqueous solution, the courier-cation and the counter-anion are more likely to be present as ions than to form a salt. Therefore, the effect of the salt formation on the electromotive force is much smaller than that of the electrode reactions (oxidization and reduction reactions) on the electromotive force. As the result, the bipolar battery of the present invention, whose main source of the electromotive force is the electrode reactions, generate more stable electric power than the conventional neutralization-type batteries whose main source of electromotive force is the neutralization reaction.

The half reaction formulas (the formulas 1 and 2) can be combined to give the following formula 3.

$$H_2O_2(aq) \rightarrow H_2O + \tfrac{1}{2}O_2 \quad \text{(Formula 3)}$$

In the formula, "(aq)" represents a hydrated state

According to the thermodynamic calculation, the change in enthalpy ($\Delta H$), the change in entropy ($\Delta S$), and the change in Gibbs free energy ($\Delta G$) (T represents temperature in Kelvin (K)) are respectively $\Delta H = -94.7$ kJ/mol, $\Delta S = 28$ J/Kmol, and $\Delta G = \Delta H - T\Delta S = -103.1$ kJ/mol.

Also, the theoretical electromotive force E and the theoretical maximum efficiency ($\eta$) are respectively calculated as $E = -\Delta G/nF = 1.07V$ and $\eta = \Delta G/\Delta H \times 100 = 109\%$, wherein n represents the number of electrons that participate in the reaction; and F is the Farady constant. The theoretical feature of this reaction is that the entropy increases through the decomposition reaction of hydrogen peroxide with the result that $\Delta S$ is positive. For this reason, the absolute value of. $\Delta G$ becomes greater than that of $\Delta H$ and the theoretical maximum efficiency exceeds 100%. However, in other fuel-cell reactions such as the hydrogen-oxygen system and direct methanol system, $\Delta S$ is negative.

When hydrogen peroxide is used in the electric-power generating method of the invention, theoretical characteristics of the method can be summarized as follows.

In other conventionally-known fuel cells, in principle, the amount of entropy change $T\Delta S$ cannot be utilized for generation of electric power but is released as heat. On the other hand, in the embodiment of the power generation method of the invention, the increase in entropy caused by absorption of heat from the outside can be utilized for generation of electric power. At a higher reaction temperature T, the absolute value of the $\Delta G$ is greater and the electromotive force is greater.

In practical batteries, the output voltage is not determined only by the theoretical electromotive force of the ionic reaction formula. Due to overvoltage or the like, the voltage lowers and heat is generated. For example, when unit cells are stacked and integrated or when a battery is incorporated into a product, the generated heat causes problems. However, as described above, when the electric-power generating method of the invention is employed, the heat can theoretically be reused for the power generation and there is a possibility that the heat generation as a whole is reduced. Although the $\Delta G$, which corresponds to the total amount of energy usable for power generation, is approximately half of that in the case of the hydrogen/oxygen fuel cell, the theoretical electromotive force is approximately the same as that of the hydrogen/oxygen fuel cell. This is because n=1 in the case of the method of the present invention and n=2 in the case of the hydrogen/oxygen fuel cell, wherein n represents the number of electrons participating in the reaction.

Regarding the system which regenerates the reactive substance(s) from the power generation products and which supplies the regenerated reactive substance(s) to the acidic medium and/or the basic medium, the system (device) described above as the system (device) for the secondary battery can be used.

When the reactive substance S and T are hydrogen peroxide in the secondary battery of the invention or the power generation method of the invention, the following effects can be achieved in addition to the effects recited above.

(1) In the reaction of converting chemical energy to electric energy, hydrogen peroxide does not release carbon dioxide but releases oxygen. In addition, since combustible materials, flammable materials, harmful heavy metals are not used as structural elements of the battery, the jacket of the battery can be simple. Therefore, the battery is excellent in environmental safety over the entire product cycle including manufacture, use, and disposal.

(2) Since hydrogen peroxide is liquid under ordinary temperature and ordinary pressure, a heavy metal tank or the like for storage is unnecessary. Moreover, since liquid hydrogen peroxide can be mixed with water at an arbitrary ratio, it is easy to form a gel containing hydrogen peroxide. Therefore, the battery has excellent storability and portability.

(3) Since it is unnecessary to use oxygen as the oxidizing agent, the battery can be used without difficulty even in a closed environment where air amount is limited or in a harsh environment in which the air contains a lot of dust.

(4) Industrial synthetic methods for hydrogen peroxide have been established such as the organic process. In the organic process, anthraquinone is used as the intermediate and hydrogen peroxide is synthesized through catalytic reduction with hydrogen and catalyst and through air oxidation. In the organic process, the intermediate, anthraquinone, is recycled so that its amount does not decrease. Accordingly, hydrogen peroxide is supplied at low cost to the present market. In addition, since the battery has a simple structure with a few components, the whole weight and volume of the battery system can be small, the cost can be reduced and the battery can be highly durable.

It should be noted that the constitution of the present invention is not limited to the embodiments of the secondary battery and the power generation method described above.

For example, the secondary batteries of the above embodiments may be combined with hydrogen-fueled or methanol-fueled batteries to form complex power generators.

EXAMPLES

Although the effect of the invention will be explained more specifically in the following with the Examples and Comparative Examples, the present invention is not limited to these Examples.

Example 1

Figure 6:
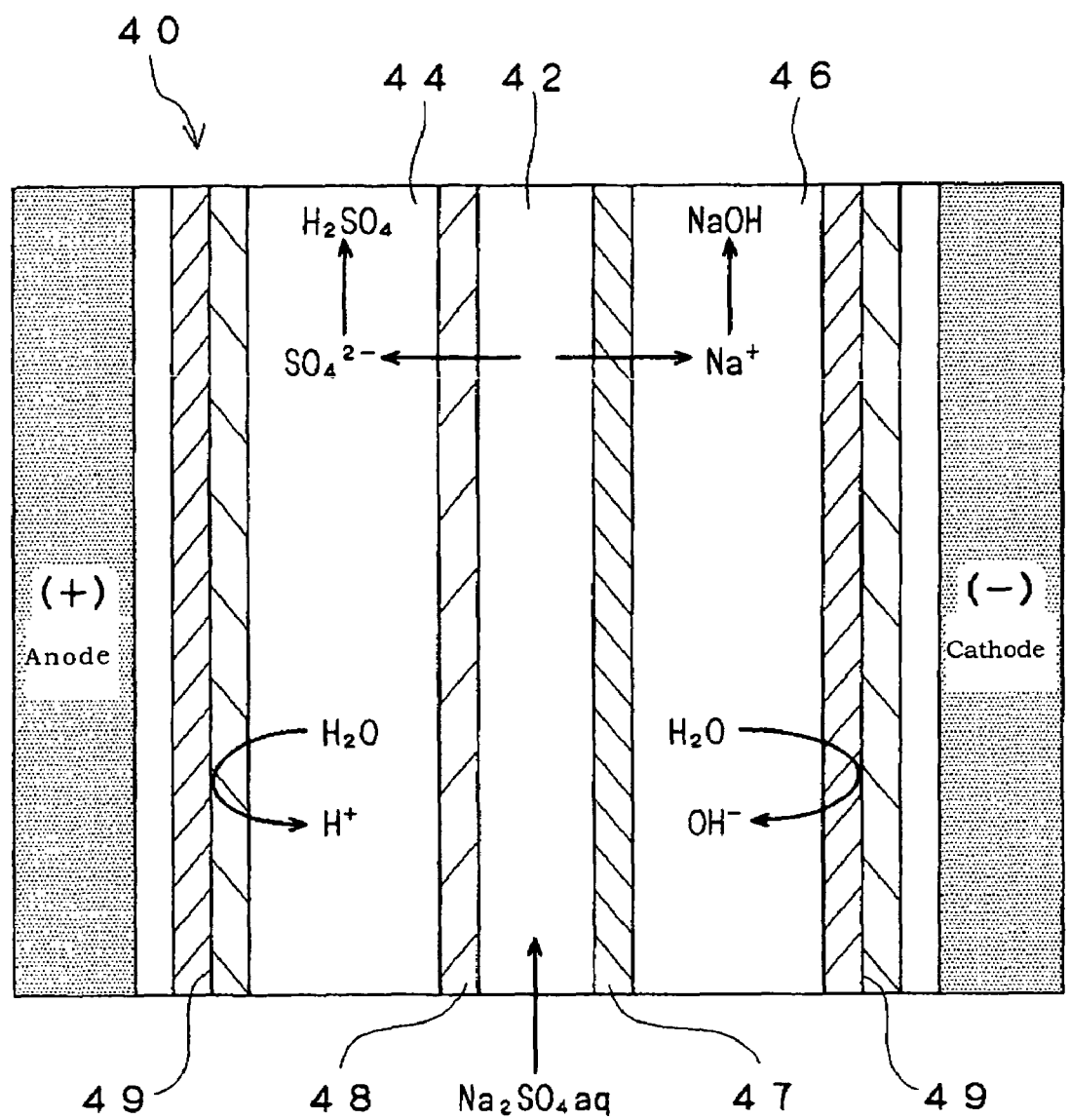
FIG. 6 is an explanatory view schematically illustrating the construction of medium regenerating device.

A secondary battery is provided which has the power generating part illustrated in FIG. 3 and the charging part illustrated in FIGS. 4 to 6. The battery is used for power generation experiments under the conditions described below and the electric current/voltage characteristic is determined. In this way, the battery is evaluated. The details of the power generating part and charging part are as follows.

(Power Generating Part)

First, 3 mass % of commercially available aqueous solution of hydrogen peroxide (Japan Pharmacopeia oxydol, manufactured by Kenei Phamaceutical Co. Ltd.) is mixed with sulfuric acid (96%, the highest quality, manufactured by Kanto Chemical Inc.) and distilled water so that a sample solution A (having a hydrogen peroxide concentration of 9.1 mmol/l and a sulfuric acid concentration of 0.1 N (0.05 mol/l)) is prepared.

Also, 3 mass % of commercially available aqueous solution of hydrogen peroxide (Japan Pharmacopeia oxydol, manufactured by Kenei Phamaceutical Co. Ltd.) is mixed with sodium hydroxide (97%, the highest quality, Kanto Chemical Inc.) and distilled water, so that a sample solution B (having a hydrogen peroxide concentration of 9.1 mmol/l and sodium hydroxide concentration of 0.1N (0.05 mol/l)) is prepared.

And, the sample solution A is injected at the inlet 2 illustrated in FIG. 3 by an external pump. The sample solution B is injected at the inlet 3 illustrated in FIG. 3 by an external pump. The flow rates of the sample solutions A and B are 24 μl/sec (the Reynolds number Re being approximately 670) and the temperature at the experiment is room temperature (approximately 20° C.).

Gas generation is not observed on the surface of the first electrode 8 (platinum thin film with an area of 0.026 cm$^2$) at the bottom portion of the flow passage contacting the sample solution A. However, oxygen gas generation is observed on the surface of the second electrode 6 (platinum thin film with an area of 0.026 cm$^2$) at the bottom portion of the flow passage contacting the sample solution B. This is because the first electrode 8 acts as a positive pole on which water is produced through the above-described reaction of the formula 1, whereas the second electrode 6 acts as a negative pole on which oxygen and water is produced through the above-described reaction of the formula 2.

Figure 7:
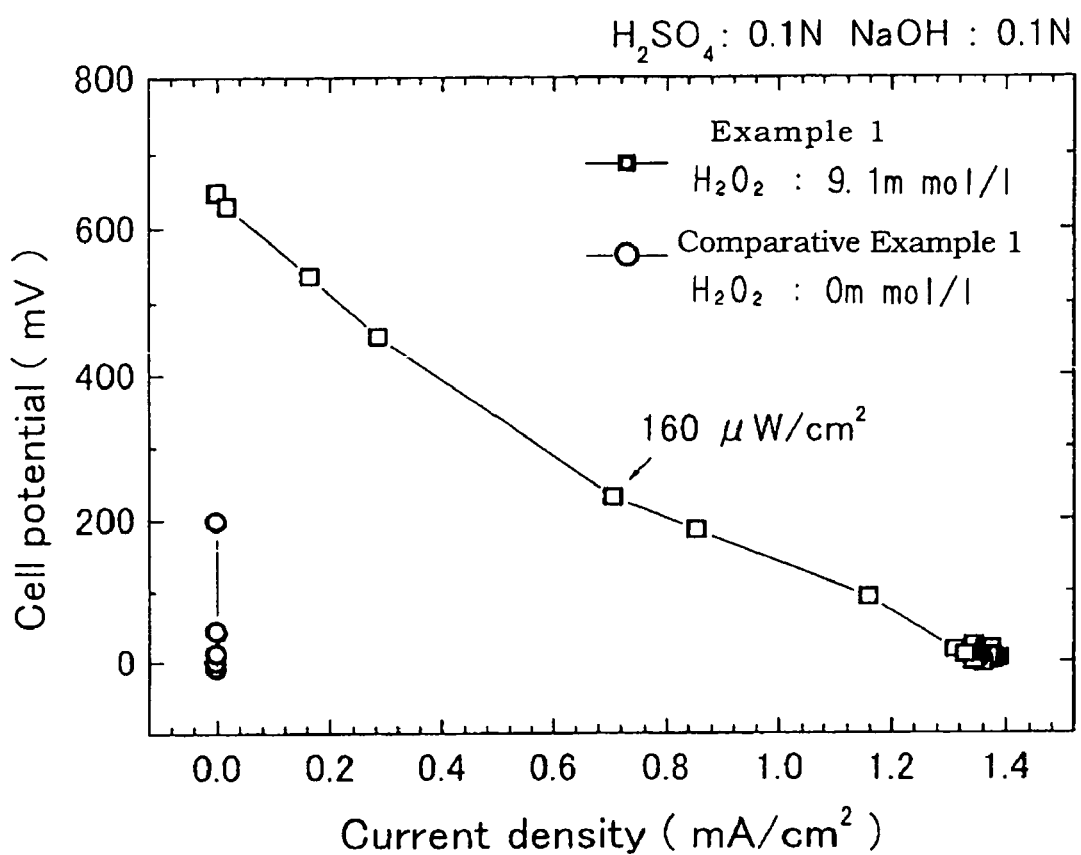
FIG. 7 is a diagram illustrating an electric current-voltage characteristic in each of an example and a comparative example.

The current/voltage characteristic of the power generating part of the battery is shown in FIG. 7. In the case of the Example, the release voltage is 650 mV and the maximum output is 160 μW/cm$^2$ (at the electromotive force of 230 mV and the current density of 0.7 mA/cm$^2$).

(Charging Part)

After the power generation, the battery is charged as illustrated in FIGS. 4 through 6 (except for excluding the electrodialysis bath 20). Namely, first, an aqueous solution of sodium sulfate produced by the power generation is supplied to the salt chamber 42 of the 3-chamber bipolar membrane electrodialysis bath (the medium regenerating device 40). While the water produced by the power generation is continuously supplied to the acid chamber 44 and the base chamber 46, a direct-current voltage is applied between the anode and the cathode. The direct-current voltage is 4V and is applied by a constant-voltage constant-current direct-current stabilized power supply (trade name: PMC-35-0.5A, manufactured by Kikusui Electronics Corp.). The power supply is driven by a commercially available power source (100V). The same power supply is used by the reactive substance regenerating device 30. As a result, it is confirmed that sulfuric acid at a constant concentration is continuously regenerated in the acid chamber 44 and that sodium hydroxide at a constant concentration is continuously regenerated in the base chamber 46.

Also, in a hydrogen peroxide cell (manufactured by Permelec Electrode Ltd., the 1.25 dm$^2$ diaphragm type) that serves as the reactive substance regenerating device 30, a direct-current voltage (5V) is applied between the anode 32*a* and the cathode 34*a*. While the direct-current voltage is applied, the aqueous solution of sodium sulfate which has been produced by the power generation and adjusted to 0.02 mol/l is supplied to each of the anode chamber 32 and the cathode chamber 34 at a rate of 5 ml/min. Simultaneously, the cathode chamber 34 is further supplied with oxygen that has been produced by the power generation. As a result, it is confirmed that an aqueous solution of hydrogen peroxide at a concentration of 0.1 mol/l has been continuously regenerated.

Using the hydrogen peroxide, sulfuric acid, and sodium hydroxide regenerated in the charging part as the reactive substance, acidic medium, and basic medium respectively, power generation is conducted again. As a result, the same characteristic as that of the first power generation is obtained.

Comparative Example 1

A secondary battery is prepared which is the same as the secondary battery of Example 1 except that no hydrogen peroxide is contained in the sample solution. Then, the same evaluation as that in Example 1 is conducted on the secondary battery. The concentration of sulfuric acid in the sample solution A which is injected at the inlet 2 of the power generating part is 0.1N. The concentration of sodium hydroxide in the sample solution B which is injected at the inlet 3 of the power generating part is also 0.1N. The flow rates and temperature at the experiment are the same as in Example 1.

The current/voltage characteristic is shown in FIG. 7. In Comparative Example 1, although a release electric power (20 mV) resulting from the liquid junction potential is measured, a significant amount of electric current is not obtained.

As described above, in the Example, voltage and current shown in FIG. 7 are obtained and it is confirmed that the power generating part can supply sufficient electric energy stably. Also, it is confirmed that the battery of the invention with the simple constitution is capable of charging and discharging while the components in the electrolytes are recycled.

According to the present invention, a secondary battery and a power generation method are provided in which sufficient electromotive force is obtained stably by accelerating the electrode reactions and which charging and discharging are possible while the electrolyte components such as the reactive substance are recycled.

What is claimed is:

1. A secondary battery comprising a power generating part and a charging part,
   the power generating part comprising:
   a first electrode disposed in an acidic medium;
   a second electrode disposed in a basic medium; and
   a flow passage configured to form laminar flow of an acidic solution of the acid medium and a basic solution of the basic medium flow through the flow passage,
   wherein the acidic medium and the basic medium are disposed adjacent to each and,
   at least one of the acidic medium or the basic medium includes at least one reactive substance; and
   the charging part comprising a reactive substance regenerating device which regenerates the reactive substance from power-generation products produced by electric power generation in the power generating part.

2. The secondary battery according to claim 1, wherein the charging part further comprises a medium regenerating device which regenerates the acidic medium and/or the basic medium from the power-generation products.

3. The secondary battery according to claim 1, wherein each of the acidic medium and the basic medium includes the reactive substance(s).

4. The secondary battery according to claim 3, wherein the reactive substance in the acidic medium and the reactive substance in the basic medium are the same.

5. The secondary battery according to claim 1, wherein both of the acidic medium and the basic medium include hydrogen peroxide as the reactive substance.

6. The secondary battery according to claim 5, wherein the reactive substance regenerating device comprises an anode and a cathode and is configured to regenerate hydrogen peroxide by supplying, to the cathode, oxygen and water produced by the electric power generation.

7. The secondary battery according to claim 6, wherein the reactive substance regenerating device further comprises a direct-current source which applies a direct-current voltage between the anode and the cathode.

8. The secondary battery according to claim 1, wherein the medium regenerating device comprises a 3-chamber cell comprising an acid chamber, a salt chamber, and a base chamber which are formed by an anion-exchange membrane, a cation-exchange membrane, and bipolar membranes, wherein the medium regenerating device is configured to supply an aqueous solution of neutralization salt produced by the electric power generation to the salt chamber and to subject the aqueous solution to an electrodialysis so that the acidic aqueous solution and the basic aqueous solution are regenerated respectively in the acid chamber and the base chamber, and the regenerated acidic aqueous solution and the regenerated basic aqueous solution are discharged from the chambers.

9. The secondary battery according to clam 1, wherein the acidic aqueous solution includes an acid selected from the group consisting of sulfuric acid, methane sulfonic acid, trifluoromethane sulfonic acid, hydrochloric acid, hydriodic acid, hydrobromic acid, perchloric acid, periodic acid, orthophosphonc acid, polyphosphoric acid, nitric acid, tetrafluoroboric acid, hexafluorosilicic acid, hexafluorophosphoric acid, hexafluoroarsenic acid, hexachioroplatinic acid, acetic acid, trifluoroacetic acid, citric acid, oxalic acid, salicylic acid, tartaric acid, maleic acid, malonic acid, phthalic acid, fumaric acid, and picric acid.

10. The secondary battery according to claim 1, wherein the basic aqueous solution includes a base selected from the group consisting of sodium hydroxide, potassium hydroxide, lithium hydroxide, calcium hydroxide, ballium hydroxide, magnesium hydroxide, ammonium hydroxide, tetramethylammonium hydroxide, tetraethylammonium hydroxide, tetrapropylammonium hydroxide, and tetrabutylammonium hydroxide, or includes an alkali metal salt selected from the group consisting of sodium carbonate, sodium hydrogencarbonate, potassium carbonate, potassium hydrogencarbonate, sodium borate, potassium borate, sodium silicate, potassium silicate, sodium tripolyphosphate, potassium tripolyphosphate, sodium aluminate, and potassium aluminate.

11. The secondary battery according to claim 1, wherein the first electrode comprises a material selected from the group consisting of platinum, platinum black, platinum-oxide clad platinum, silver, gold, titanium whose surface was passivated, stainless steel whose surface was passivated, nickel whose surface was passivated, aluminum whose surface was passivated, carbonic structure, amorphous carbon, and glassy carbon.

12. The secondary battery according to claim 1, wherein the second electrode comprises a material selected from the group consisting of platinum, platinum black, platinum-oxide clad platinum, silver, gold, titanium whose surface was passivated, stainless steel whose surface was passivated, nickel whose surface was passivated, aluminum whose surface was passivated, carbonic structure, amorphous carbon, and glassy carbon.

13. The secondary battery according to claim 1, wherein the first and second electrodes each independently are in a form of a plate, a thin membrane, a mesh, or a fiber.

14. An electric power generating method, comprising:
   providing an acidic medium in which a first electrode is disposed and a basic medium in which a second electrode is disposed, wherein at least one reactive substance is included in at least one of the acidic medium or the basic medium; and
   causing an oxidation reaction in the acidic medium and/or a reducing reaction in the basic medium by the reactive substance to generate power;
   wherein the acidic medium and the basic medium are disposed adjacent to each other, the reactive substance is regenerated from power-generation products produced by power generation and supplied to at least one of the acidic medium or basic medium and an acidic solution of the acid medium and a basic solution of the basic medium flow through a flow passage in the power generating part, and the acidic solution and the basic solution form laminar flows in the flow passage.

\* \* \* \* \*